United States Patent [19]
Raghavan et al.

[11] Patent Number: 5,879,264
[45] Date of Patent: Mar. 9, 1999

[54] MULTI-SPEED PLANETARY POWER TRANSMISSION

[75] Inventors: Sekhar Raghavan; Kumaraswamy V. Hebbale; Patrick Benedict Usoro, all of Troy, Mich.

[73] Assignee: General Motors Corporation, Detroit, Mich.

[21] Appl. No.: 925,259

[22] Filed: Sep. 8, 1997

[51] Int. Cl.$^6$ .......................................................... F16H 3/44
[52] U.S. Cl. .......................... 475/280; 475/271; 475/281; 475/282; 475/296
[58] Field of Search .................................... 475/269, 271, 475/280, 281, 282, 283, 296, 297, 284, 285, 286, 287

[56] References Cited

U.S. PATENT DOCUMENTS

| | | | |
|---|---|---|---|
| 2,873,624 | 2/1959 | Simpson | 475/280 |
| 3,946,623 | 3/1976 | Murakami et al. | 475/280 X |
| 4,627,310 | 12/1986 | Coburn | 475/271 X |
| 5,342,258 | 8/1994 | Egyed | 475/280 X |

*Primary Examiner*—Charles A. Marmor
*Assistant Examiner*—Sherry Lynn Estremsky
*Attorney, Agent, or Firm*—George A. Grove; Donald F. Scherer

[57] ABSTRACT

A powertrain has a planetary transmission with two simple planetary gearsets interconnected between an input shaft and an output shaft. The planetary gearsets are controlled to establish five forward speed and torque ratios and one reverse speed and torque ratio by selective engagement of three clutches and two brakes.

4 Claims, 2 Drawing Sheets

MULTI-SPEED PLANETARY POWER TRANSMISSION

TECHNICAL FIELD

This invention relates to power transmissions having a planetary gear arrangement controlled to provide a plurality of speed and torque ratios.

BACKGROUND OF THE INVENTION

Planetary gear arrangements provide five forward speeds and a reverse speed and utilize either a compound planetary (intermeshing pinion gears) or three simple planetary gearsets. Both of these type of gear arrangements generally include six or more friction devices and are more complex and incorporate more cost than two simple planetary gearsets. The transmissions may incorporate fewer clutches and brakes if double transition shifting or nonsequential shifting is permitted.

The compound planetary and three simple planetary gearsets generally include six or more friction devices and are more complex and therefore incorporate more cost than two simple planetary gearsets.

Four speed planetary gear arrangements generally use two simple planetary gearsets. These transmissions will usually incorporate five friction devices to establish the four forward speeds and one reverse speed.

SUMMARY OF THE INVENTION

It is an object of the present invention to provide an improved power transmission having five forward speed ratios and a reverse speed ratio.

In one aspect of this invention, two simple planetary gearsets interconnected between an input shaft and an output shaft are controlled by five selectively engageable friction devices to establish five forward speed ratios and one reverse speed ratio.

In another aspect of this invention, the friction devices include three clutch assemblies and two brake assemblies which are selectively engaged to provide the speed ratios.

In yet another aspect of this invention, a member of one planetary gearset is continuously connected with the input shaft and a member of the other planetary gearset is continuously connected with the output shaft.

In still another aspect of this invention, one of the clutch assemblies selectively interconnects like members of the two planetary gearsets.

In a further aspect of this invention, the lowest forward speed ratio and the highest forward speed ratio utilize both of the planetary gearsets to establish their respective power paths between the input shaft and the output shaft.

In yet a further aspect of this invention, one of the planetary gearsets is controlled to establish the same ratio therein during both the lowest forward speed ratio and the highest forward speed ratio.

In still a further aspect of this invention, the one planetary gearset is controlled to establish the same ratio during reverse operation as the ratio established during the lowest forward speed operation.

DESCRIPTION OF EXEMPLARY EMBODIMENTS

Figure 1:
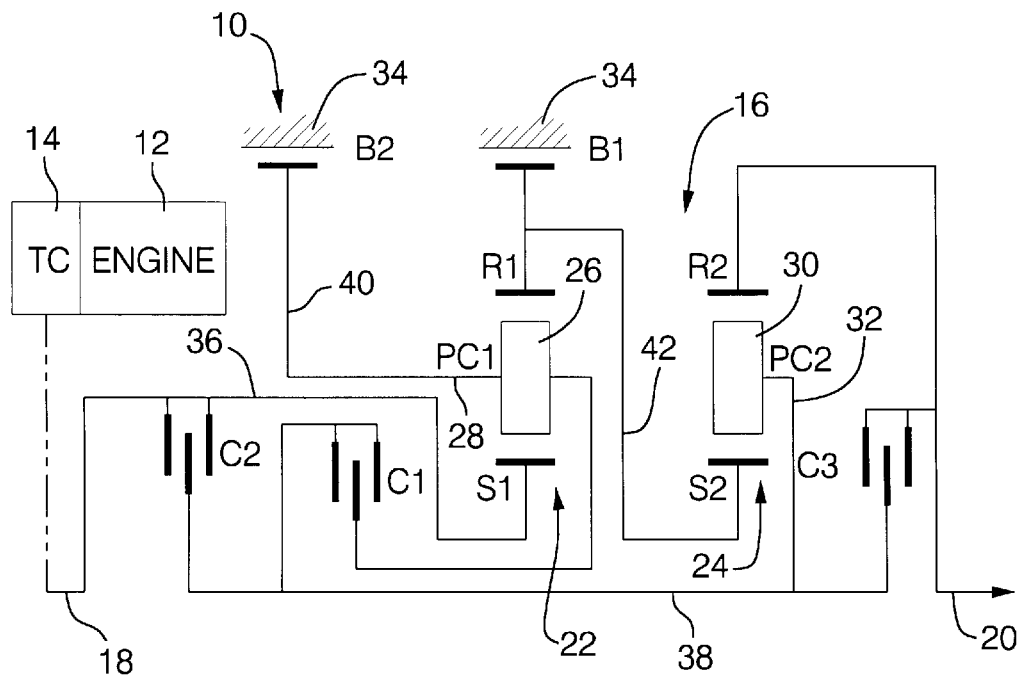
FIG. 1 is a schematic diagram of a powertrain incorporating the present invention.
Figure 3:
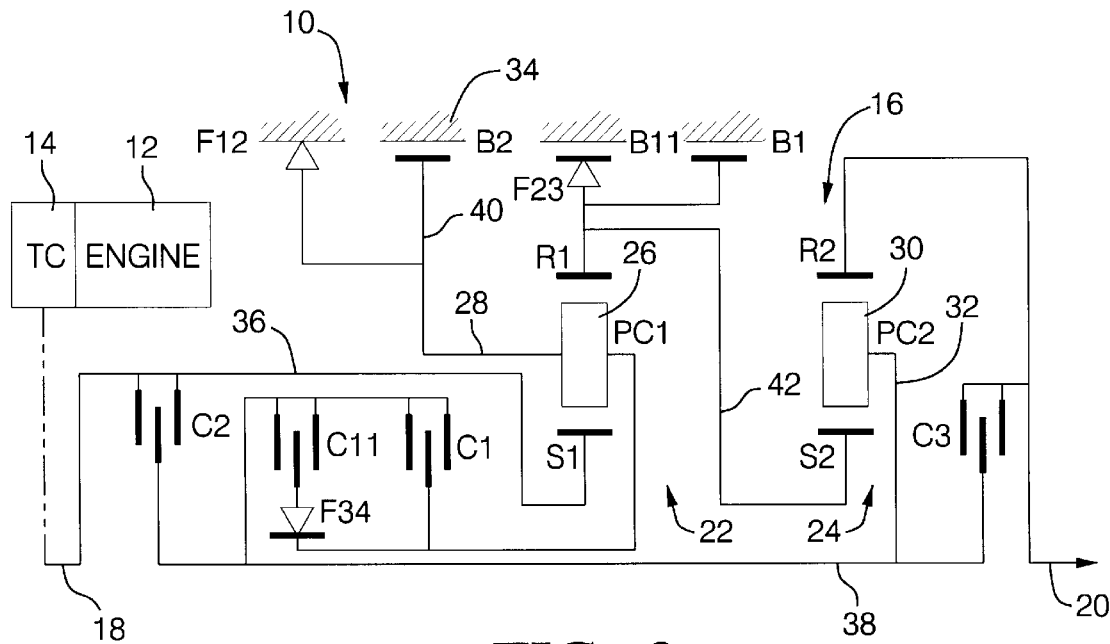
FIG. 3 is a schematic diagram of another powertrain incorporating the present invention.

Referring to the drawings, wherein like characters represent the same or corresponding parts throughout the several views, there is seen in FIGS. 1 and 3 a powertrain generally designated 10 having an engine 12, a torque converter 14, a planetary gear arrangement 16, an input shaft 18 and an output shaft 20. The torque converter 14 is a conventional hydrodynamic device which is well known to those skilled in the art.

The planetary gear arrangement 16 includes a pair of simple planetary gearsets 22 and 24, which are interconnected between the input shaft 18 and the output shaft 20. The planetary gearset 22, includes a sun gear S1, a ring gear R1 and a planet carrier assembly PC1. The planetary carrier assembly PC1 includes a plurality of pinion gears 26 rotatably mounted on a carrier 28.

The planetary gearset 24 includes a sun gear S2, a ring gear R2 and a planet carrier assembly PC2. The planet carrier assembly PC2 includes a plurality of pinion gears 30 rotatably mounted on a carrier 32. Both the planetary gearsets 22 and 24 are of the simple planetary type. That is, a single pinion mesh is incorporated between the sun gear and ring gear.

The planetary gearset 16, shown in FIG. 1, is controlled by the selective engagement of three clutches C1, C2 and C3, and two brakes B1 and B2. The clutches and brakes are conventional fluid operated friction devices which are well known to those skilled in the art. The brakes B1 and B2 are depicted as band brakes, however, disc type brakes will also be useful in the present invention. The brakes B1 and B2 are grounded to a transmission housing 34.

The sun gear S1 is continuously connected through a drive member or hub 36 to the input shaft 18. The clutch C1 is effective to interconnect the planet carrier assembly PC1 with the planet carrier assembly PC2 through a shaft 38. The planet carrier assembly PC1 is also connected through a hub 40 with the brake B2.

The ring gear R1 is connected to the brake B1 and through a hub 42 with the sun gear S2. Therefore, whenever the brake B1 is applied, both the ring gear R1 and sun gear S2 are grounded and become stationary. The clutch C2 interconnects the input shaft via hub 36 and the shaft 38 with the planet carrier assembly PC2.

The clutch C3 is effective when engaged to connect the planet carrier PC2 with the output shaft 20 or in effect cause a 1:1 or direct ratio within the planetary gearset 24. As will be obvious to those familiar with the art, the engagement of the clutch C3 will cause the carrier assembly PC2 and the ring gear R2 to rotate in unison which, of course, in a planetary gearset causes the entire set to rotate as a unit.

Figure 2:
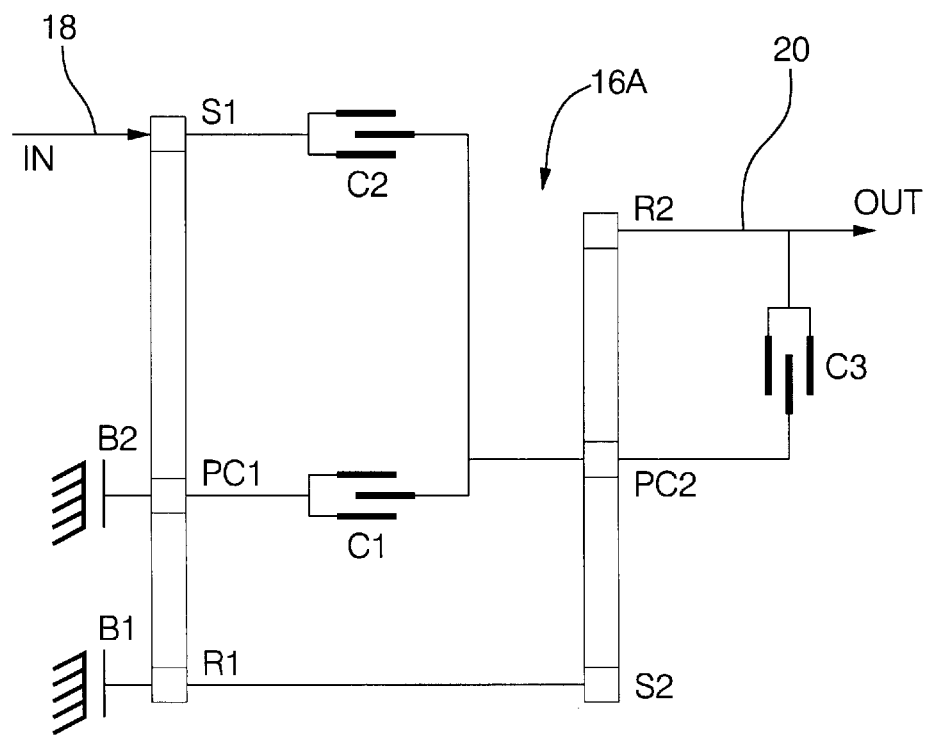
FIG. 2 is a lever diagram of the planetary gear arrangement of the powertrain shown in FIG. 1.

The lever diagram shown in FIG. 2 is a depiction of the planetary gear arrangement 16 and is designated 16A. The various gear elements and friction elements are given the same designation and it should be noted that the sun gear S1 is connected directly with the input shaft and the ring gear R2 is connected directly with the output shaft.

To establish the first and lowest speed ratio, which is an underdrive ratio, the clutch C1 and brake B2 are engaged. The engagement of these two friction devices causes the carriers PC1 and PC2 to be connected to ground, or the transmission housing 34, while the sun gear S1 is driven by the engine 12 through the torque converter 14. With the carrier PC1 grounded, the ring gear R1 will rotate in a direction opposite to the engine which will in turn drive the sun gear S2 in that direction. The carrier PC2 being grounded will cause the ring gear R2 to rotate forwardly in the direction opposite to the sun gear S2. This will cause the output shaft 20 to rotate forward at a reduced speed relative to the input shaft 18. It should be noted that both the ratio and planetary gearset 22 and planetary gearset 24 are underdrive reversing ratios.

The second forward speed ratio is also an underdrive ratio and is established by disengaging brake B2 and engaging brake B1. This causes the carrier PC1 to rotate at an underdrive ratio and therefore drive the carrier PC2 at this underdrive speed. However, the sun gear S2 being stationary, will cause the ring gear R2 to rotate at an overdrive ratio relative to the carrier assembly PC2.

In the second forward ratio, the underdrive ratio of planetary gearset 22 is greater than the overdrive ratio of the planetary gearset 24, such that the overall speed ratio between shafts 18 and 20 is an underdrive speed ratio.

To establish the third forward speed ratio, the brake B1 is disengaged and the clutch C2 is engaged. This engagement causes the sun gear S1 and planet carrier assembly PC1 to rotate in unison and therefore a direct drive is created in planetary gearset 22. Since the sun gear S2 is driven an input speed, and because of the engagement of clutch C2, the planet carrier PC2 is driven at input speed. The second planetary gearset 24 is also driven at a 1:1 ratio resulting in a direct drive from input shaft 18 to the output shaft 20.

To establish the fourth forward speed ratio, the clutch C1 is disengaged and the brake B1 is engaged. This permits the carrier PC2 to be driven at input speed while the sun gear S2 is stationary. This will cause the ring gear R2 to be operated at an overdrive ratio, such that the speed of output shaft 20 is greater than the speed of input shaft 18.

To establish the fifth forward speed ratio, the brake B1 is disengaged while the brake B2 is engaged, thereby creating the reverse ratio in the planetary gearset 22, the same as was established in the first forward ratio. With the sun gear S2 being driven negatively and the carrier PC2 being driven positively, the ring gear R2 will be overdriven in the positive or forward direction at a speed greater than with the speed represented by sun gear S2 being held stationary. Therefore, the fifth ratio is an overdrive ratio such that the output shaft 20 rotates faster than the input shaft 18. This rotation is faster than the same relative rotation which would be created in the fourth forward speed ratio.

The reverse ratio is established by the engagement of clutch C3 and the brake B2. With the establishment of these two friction devices, it should be noted that the ring gear R1 is driven in a direction opposite or reverse to the input direction of input shaft 18. This creates a negative or reverse rotation of sun gear S2. Since the engagement of clutch C3 creates a direct or 1:1 ratio in the planetary gearset 24, the entire gearset rotates in unison at the negative speed of the sun gear S2. Therefore, the reverse ratio established by the planetary gearset 22 is the reverse ratio established between the input shaft 18 and the output shaft 20.

The planetary gear arrangement 16, shown in FIG. 3, is identical with that described above for FIG. 1, as are the clutch and brake arrangements represented by clutches C1, C2 and C3 and brakes B1 and B2. However, freewheel devices F12, F23 and F34 have been added as well as clutch C11 and brake B11. While this adds to the complexity of the transmission, it does lend for improved gear interchange or ratio interchange during the operation of the transmission.

Figure 4:
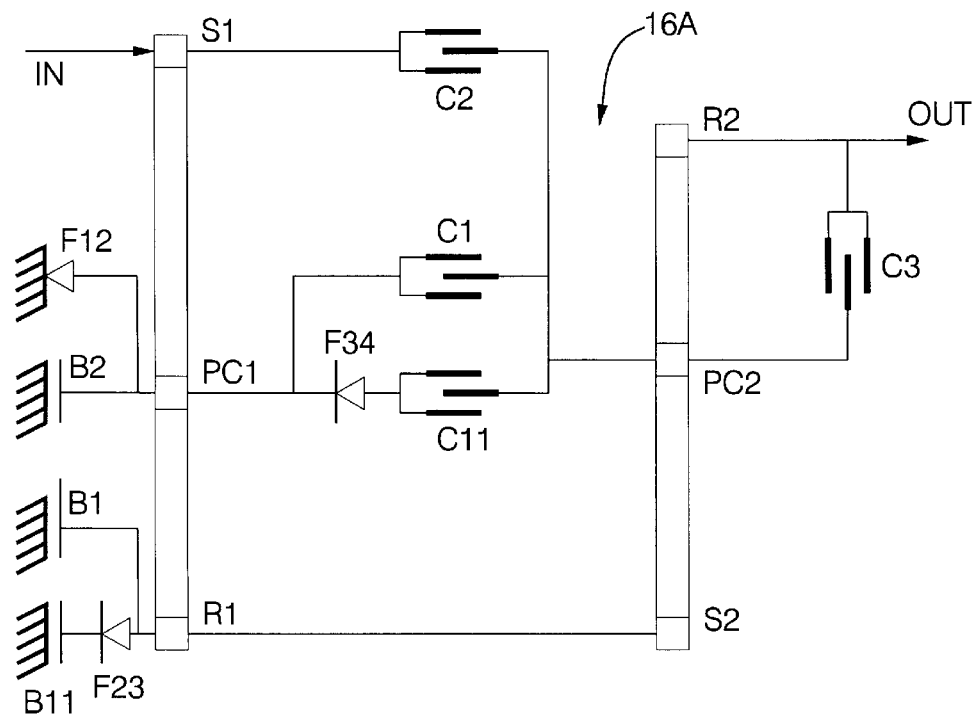
FIG. 4 is a lever diagram of the planetary gear arrangement of the powertrain shown in FIG. 3.

The lever diagram shown in FIG. 4 represents the gear arrangement of FIG. 3 with the added one-way devices. With the one-way devices incorporated to control the planetary gear arrangement 16, all the upshifts and downshifts can be established by freewheeling devices. For example, at startup, the freewheel F12 will provide reaction for the carrier PC1 during first gear. On a shift which incorporates the brake B11, the freewheel F23 will cause reaction at the sun gear S2 which will result in carrier PC1 rotating off of the one-way device F12 resulting in the second forward speed ratio being attained.

A ratio interchange from second to third will be caused by the engagement of clutch C2, such that the freewheel device F34 will cause the direct drive ratio to be established. Upon the engagement of the brake B1, the ring gear R1 will be held stationary the same as described above for FIG. 1 and the freewheel F34 will release the carrier PC2 for a rotation different from the carrier PC1. The fourth to fifth ratio interchange is not a freewheel interchange, such that brake B1 is disengaged while brake B2 is engaged.

In both planetary gear arrangements shown in FIGS. 1 and 3, the first forward ratio and the fifth forward ratio and the reverse ratio all utilize the reverse speed ratio which is established by the planetary gearset 22. The difference in the ratios being the first speed ratio also has a reverse speed ratio established in the planetary gearset 24 while the fifth and highest forward speed ratio has an overdrive ratio established in the planetary gearset 24. The reverse gear ratio utilizes a direct or unity speed ratio in the planetary gearset 24, such that the reverse gear ratio is determined strictly by the planetary gearset 22.

It should therefore be apparent to those skilled in the art that the geartrain disclosed herein establishes five forward speed and torque ratios between the input shaft 18 and the output shaft 20 and one reverse speed ratio between the input shaft 18 and the output shaft 20 through the use of two simple planetary interconnected gearsets and five friction devices represented by three clutches and two brakes. The gear arrangement of the powertrain shown in FIG. 3, of course, incorporates two additional friction devices and through the use of clutch C11 and brake B11. This arrangement in FIG. 3 also incorporates three one-way devices. The incorporation of these devices simplifies the shifting pattern and would be utilized where smoothness of operation is more important to the product than the overall cost.

The clutch C1 can be engaged in the first three forward ratios if engine coast braking is desired. Also, in the first ratio, the brake B2 is engaged if engine coast braking is desired, while in the second speed ratio, the brake B1 is engaged if coast braking is desired.

In the powertrain shown and described in FIG. 3, engine coast braking is always available in the fourth and fifth forward speed ratios. Also in FIG. 3, the reverse speed ratio is established identical with the reverse speed ratio of FIG. 1, that is, the clutch C3 and brake B2 are engaged.

We claim:

1. A power transmission comprising:

an input shaft;

an output shaft;

a first planetary gearset having a first sun gear, a first ring gear and a first carrier assembly;

a second planetary gearset having a second sun gear, a second ring gear and a second carrier assembly;

a first selectively engageable clutch operatively connectable between said input shaft and said second carrier assembly;

a second selectively engageable clutch operatively connectable between said first carrier assembly and said second carrier assembly;

a third selectively engageable clutch operatively connecting said output shaft and said second carrier assembly;

a first selectively engageable brake operatively connectable with said first ring gear;

a second selectively engageable brake operatively connectable with said first carrier assembly; and said first sun gear being continuously drive connected with said input shaft, said second ring gear being continuously drive connected with said output shaft and said first ring gear and said second sun gear being continuously connected for common rotation.

2. The power transmission defined in claim 1 wherein said clutches and brakes are selectively engaged to provide five forward ratios and a reverse ratio in said planetary gearsets and wherein said second brake is engaged in a lowest forward ratio and in a highest forward ratio to establish a ratio in said first planetary gearset, and further wherein said second clutch and said first clutch are engaged for the lowest forward ratio and the highest forward ratio, respectively.

3. The power transmission defined in claim 2 further wherein said second brake and said third clutch are engaged to establish the reverse ratio.

4. The power transmission defined in claim 1 wherein said clutches and brakes are selectively engaged to provide five forward ratios and a reverse ratio in said planetary gearsets and wherein said second brake and said third clutch are engaged to establish the reverse ratio.

* * * * *